(12) United States Patent
Measday et al.

(10) Patent No.: US 6,367,194 B1
(45) Date of Patent: Apr. 9, 2002

(54) TREE SURROUND

(76) Inventors: Brian J. Measday, 15 Braemar Road, Torrens Park; Neil Reynolds, Burrows Road, Walkerie, both of (AU), 5042; Mario Rene Niesingh, Unit 3, 43 Cungena Avenue, Park Holme (AU), 5043

( * ) Notice: Subject to any disclaimer, the term of this patent is extended or adjusted under 35 U.S.C. 154(b) by 0 days.

(21) Appl. No.: 09/367,192
(22) PCT Filed: Feb. 9, 1998
(86) PCT No.: PCT/AU98/00066
  § 371 Date: Oct. 12, 1999
  § 102(e) Date: Oct. 12, 1999
(87) PCT Pub. No.: WO98/34469
  PCT Pub. Date: Aug. 13, 1998
(51) Int. Cl.[7] ............................................. A01G 1/00
(52) U.S. Cl. ................................................ 47/23; 47/33
(58) Field of Search ............................. 47/33, 23, 26, 47/25

(56) References Cited

U.S. PATENT DOCUMENTS

| | | | | | |
|---|---|---|---|---|---|
| 933,654 | A | * | 9/1909 | Lippincott | 47/33 |
| 2,782,561 | A | * | 2/1957 | Smith | 47/33 |
| 3,475,858 | A | * | 11/1969 | Flannigan | 47/33 |
| 4,955,156 | A | * | 9/1990 | Williams | 47/25 |
| 5,060,416 | A | * | 10/1991 | Rohde | 47/23 |
| 5,566,503 | A | * | 10/1996 | Nickson | 47/33 |
| 5,661,925 | A | * | 9/1997 | MacMaster | 47/23 |

* cited by examiner

*Primary Examiner*—Charles T. Jordan
*Assistant Examiner*—Judith A. Nelson
(74) *Attorney, Agent, or Firm*—Priest & Goldstein, PL

(57) ABSTRACT

Tree surround (10) comprises a circular wall (11) formed by injection moulding in the circular shape shown from flexible polymeric material, specifically polypropylene. The material is selected to be sufficiently flexible so that the wall (11) can be distorted or twisted as shown to allow the bead (18) to be inserted from one end and to be pushed or pulled with a sliding action. Because of the flexible nature of the material then allowing for the twisting of the wall (11), it is still feasible to slide the bead (18) into the space defined by the flange (18) and an offset flange (22). This is assisted by having a lead-in shape into the space. The offset flange (22) further defining the space allows for the alignment of the wall (11) to match at each of the ends. The side wall (11) has a curvature when seen in cross section, and has a larger diameter at its base lower edge (12) than at its upper edge. The extent of the taper thus formed is such as to ensure that the respective surrounds will nest one within the other to enable efficient transport of many of the surrounds together in an assembled form. The lower edge (12) is in the form of a series of scallops (14) which define between them "blunt spikes" (15) which can more readily enter the soil than a straight edge; and physically assist in the retention or the surround in a situation where it has been located. Moulding this shape as circular in the first instance means that the shape is in a resting mode when in this shape at the start. Accordingly, when the ends are joined, there will be minimal pressure to urge on an ongoing basis any separation of any interlocked joint. There will therefore be a minimal pressure on the joint.

9 Claims, 7 Drawing Sheets

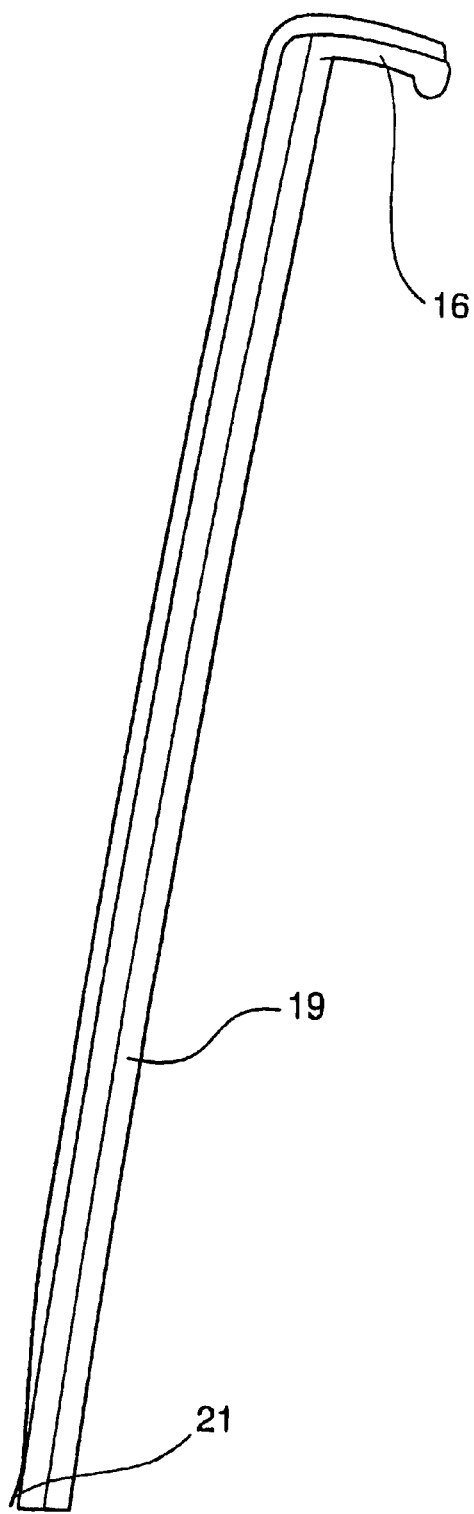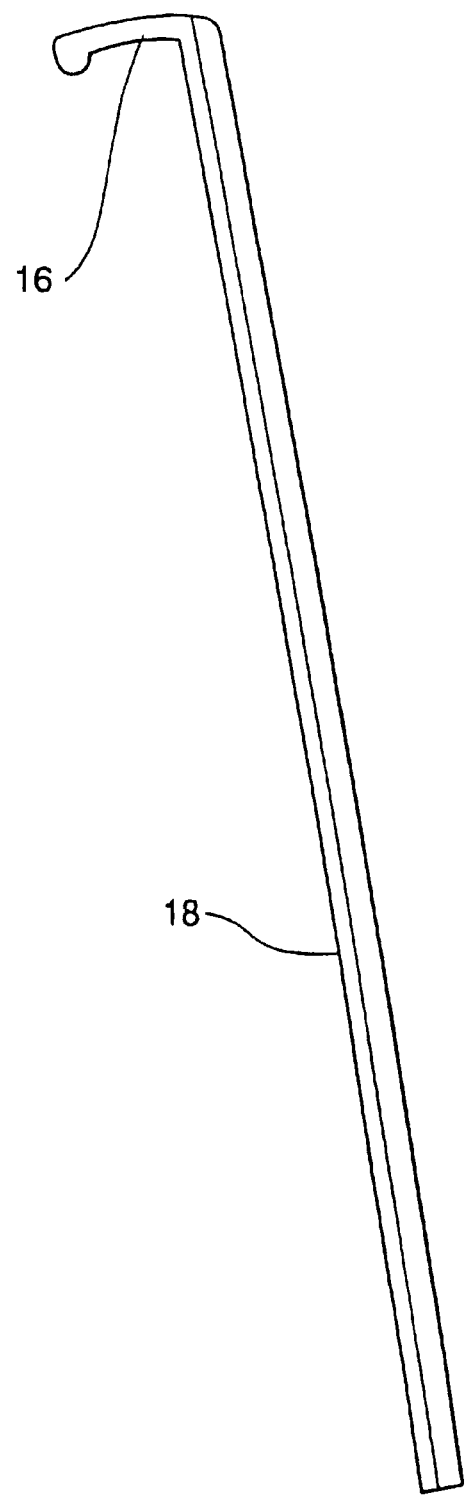
FIG 5  FIG 6

TREE SURROUND

This invention relates to water retaining surrounds for plants such as trees.

It is known to provide a water-retaining surround for plants.

An example of such a surround is described in U.S. Pat. No. 5,566,503 in the name of Nickson.

There is described in this United States patent a water retaining enclosure formed around a plant by a flexible wall of water impervious material. The wall is described as having projections at intervals on a first side and recesses on the other or second side to engage at least some of said projections for sealingly securing opposite end portions of the wall together.

The wall is described as being formed by extrusion and as being generally flat and being made from flexible plastics material and having as an essential feature a plurality of vertically extending projections distributed at regular intervals along a first side of the wall and a plurality of vertically extending recesses defined at regular intervals along the other side of the wall. These projections are resiliently received and gripped within respective recesses to effect a sealing engagement. This arrangement has the advantage that the overall diameter of the surround can be selected by joining some of the projections with a different set of the recesses.

One problem with such an arrangement however is that the appearance is less aesthetically favourable because of the plurality of vertical recesses and projections being visible. Further however by having a flat member that will be implicitly need to bent into and then be held in a circular shape means that there will be persistent pressure to release the joined ends because the plastic sheet wants to straighten out This means that the ends will be held against a persistent release resilient pressure. Plastics materials have an implicit characteristic of creeping under constant pressure and herein then lies the problem. With a surround that will be normally in the open environment and subject to extremes of weather means that the plastics material may becomes very heated. This then will result in aggravated deterioration of the assembled form.

An object of this invention is to reduce at least to some extent one or more of the above problems.

The invention accordingly can be said to reside in a plant surround comprised of a circular moulding of plastics material which is discontinuous, and has interfering surfaces between ends of the discontinuous shape which define the discontinuous zone, the surfaces at the respective ends being relatively slidable along their respective longitudinal alignment to effect an interlocking joining between the ends to provide a water retaining surround.

This then reduces the problem of persistent pressure by having the circular shape moulded and overcoming resultant other difficulties in different ways which give of themselves advantages.

If a moulding is of polymeric material and the wall is flexible, the polymeric moulding can give a high degree of water retention even if some leakage does take place at the discontinuous zone, but the flexible wall can be so distorted that the interfering surfaces can disengage by sliding in the axial zone, and the moulding can be "sprung open" to be removed from the trunk of the tree.

In preference a lower edge of the moulding is shaped to have a number of "blunt" spikes. This is found to assist in the edge being able to enter the ground. This can, for example, be achieved by having a scalloped lower edge.

In preference the tree surround comprises a circular wall formed from flexible polymeric material such as polyethylene or polypropylene, the wall having a curvature in section, and having a larger diameter near its lower edge than near its upper edge.

In preference the upper edge is directed radially inwardly in the form of a flange.

In preference said plant includes a tree.

In preference one edge of the wall terminates in a bulbous bead, and with the ends joined, the bead is located in a space defined by a curved flange along the other edge to allow a relative longitudinal sliding action to effect a separating between the two edges and is not easily-separable other than by such sliding action.

While the invention need not necessarily be limited to the above mentioned features, an embodiment is described hereunder in some detail with reference to and are illustrated in the accompanying drawings in which.

Figure 1:
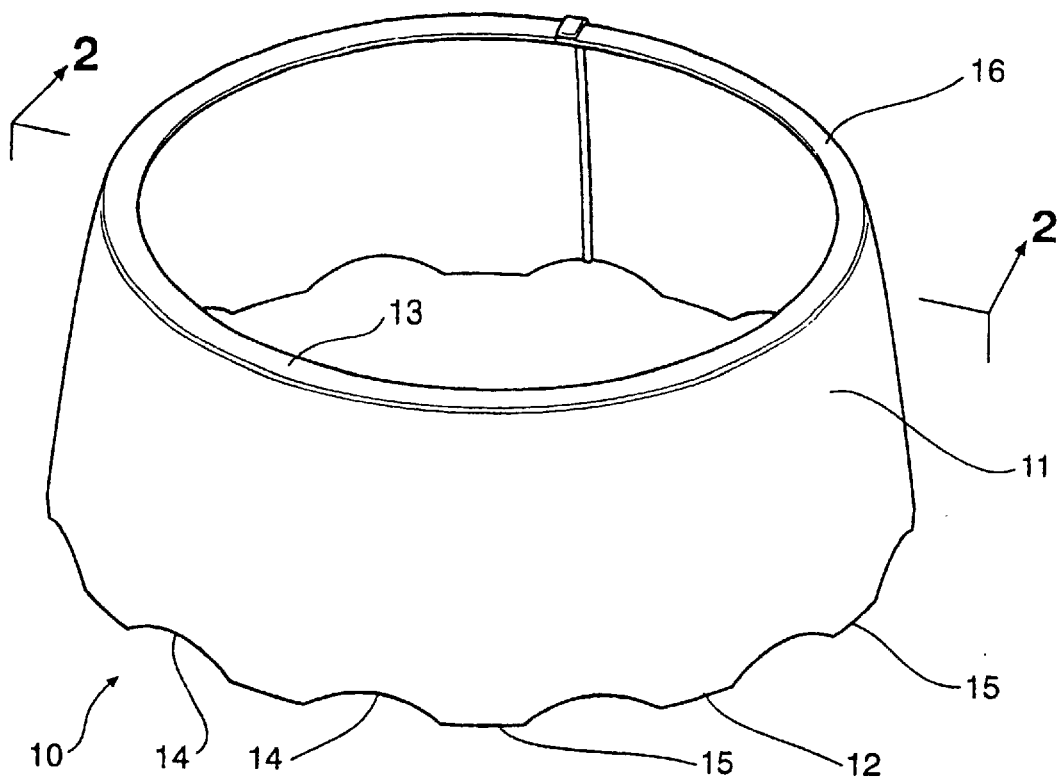
FIG. 1 is a perspective view of a tree surround according to the embodiment.
Figure 2:
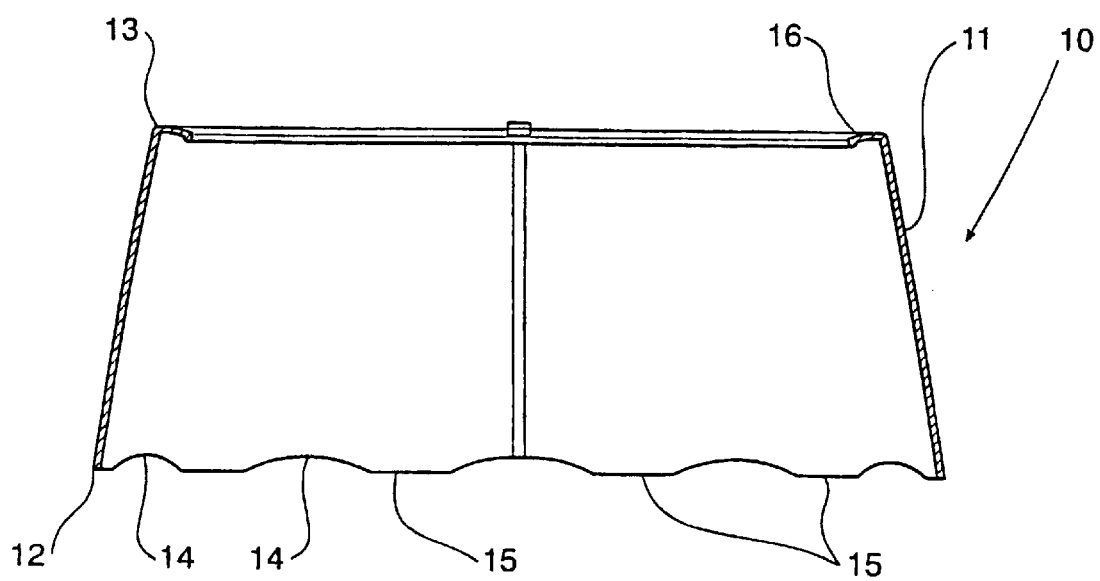
FIG. 2 is a cross section along the lines 2—2 in FIG. 1
Figure 3:
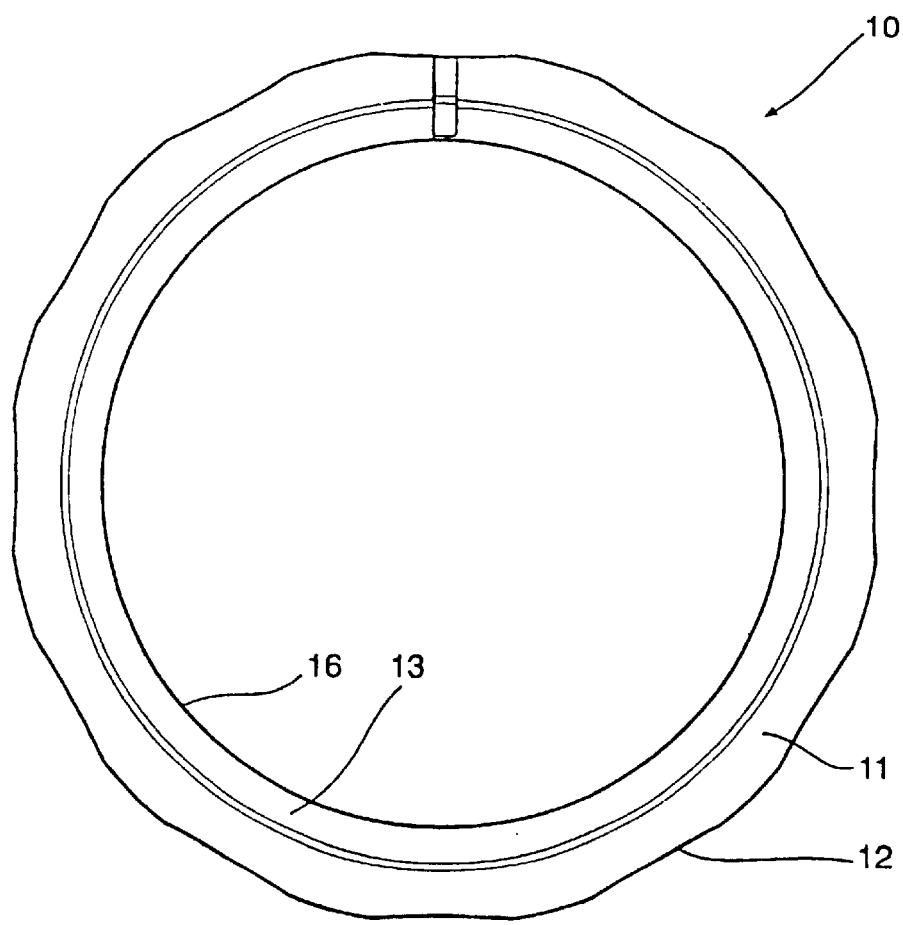
FIG. 3 is a top view of the embodiment as in FIGS. 1 and 2.
Figure 4:
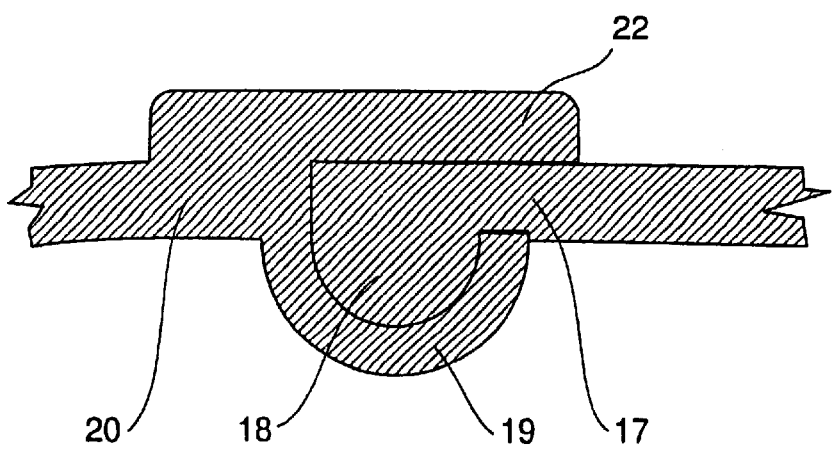
Figure 7:
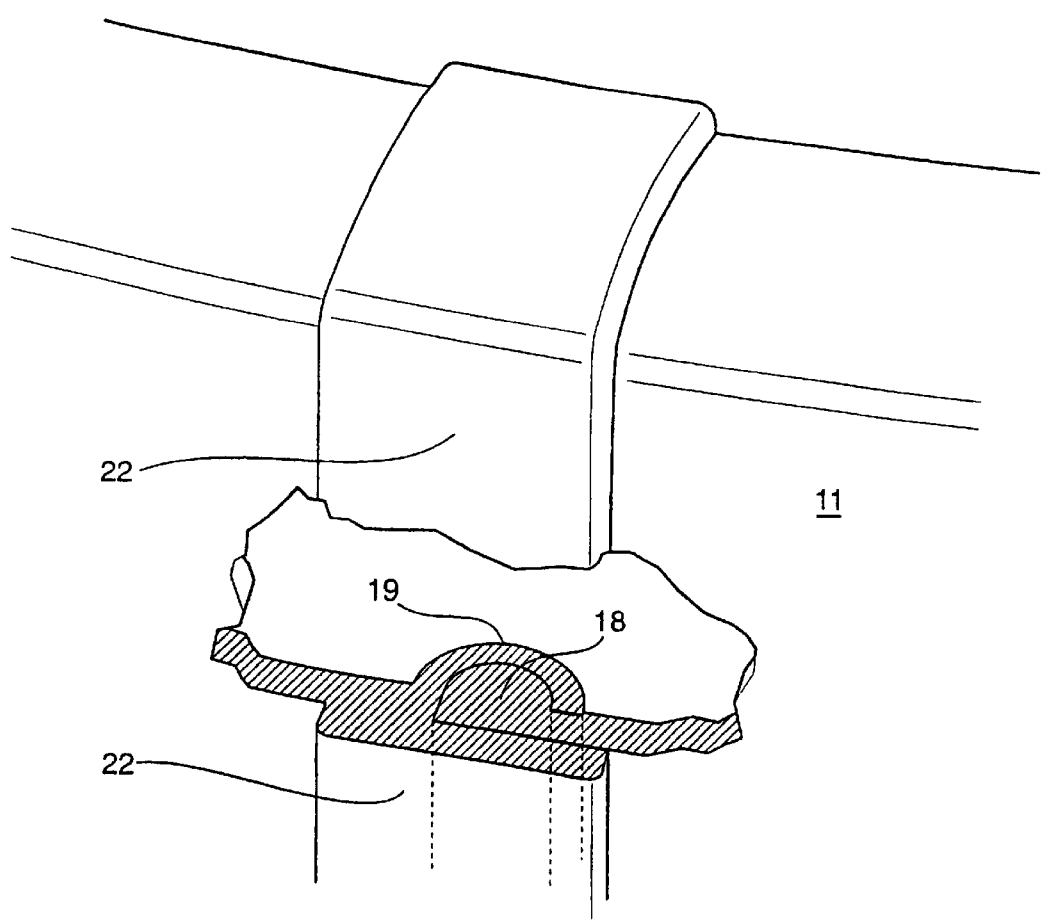
Figure 8:
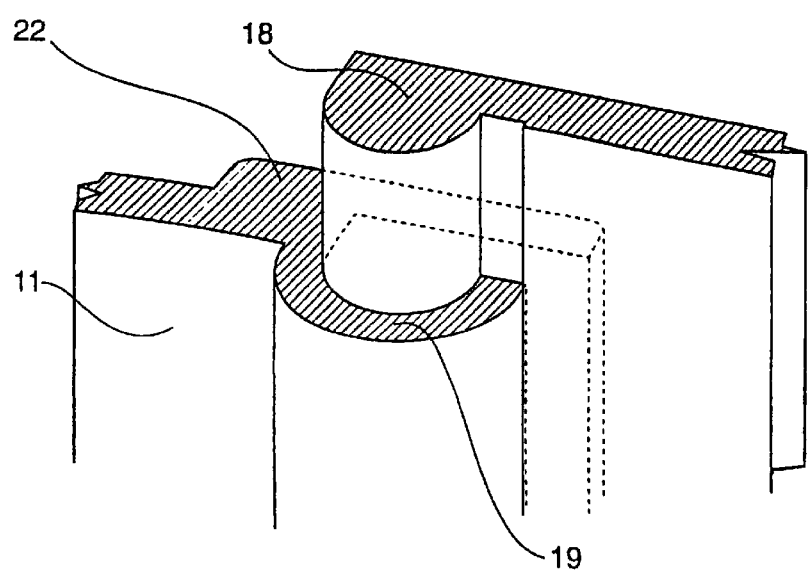
Figure 9:
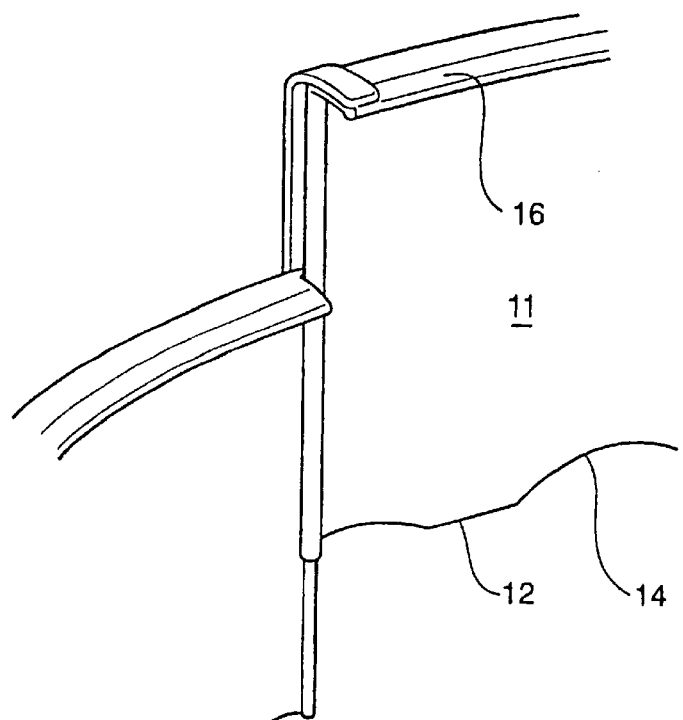
Figure 10:
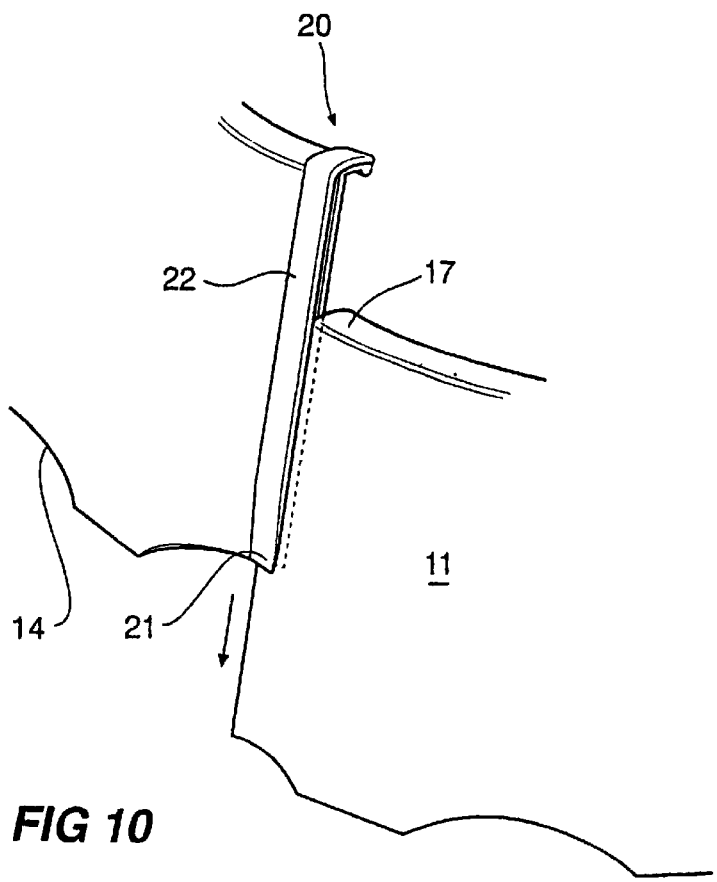
Figure 11:
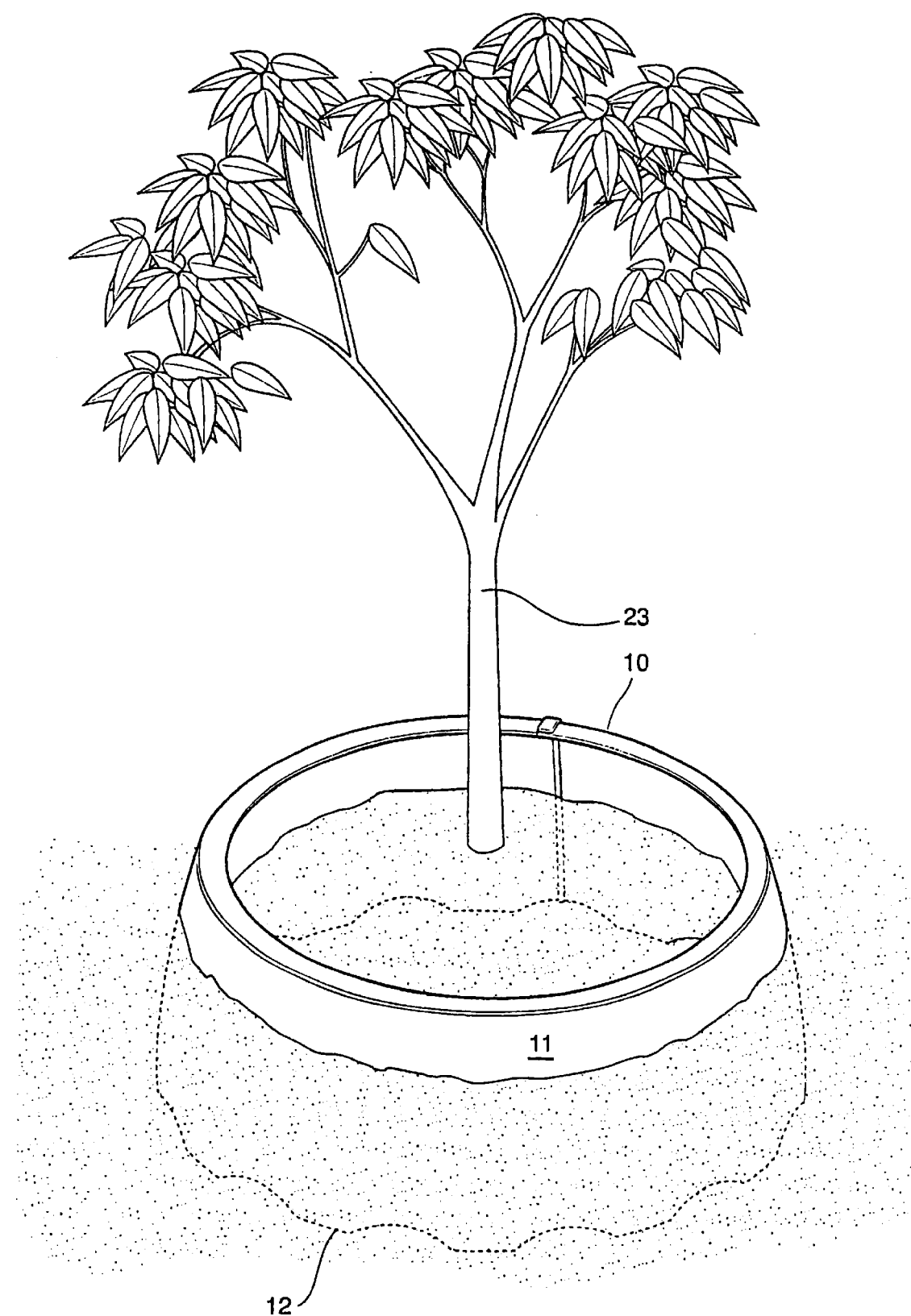
Figure 12:
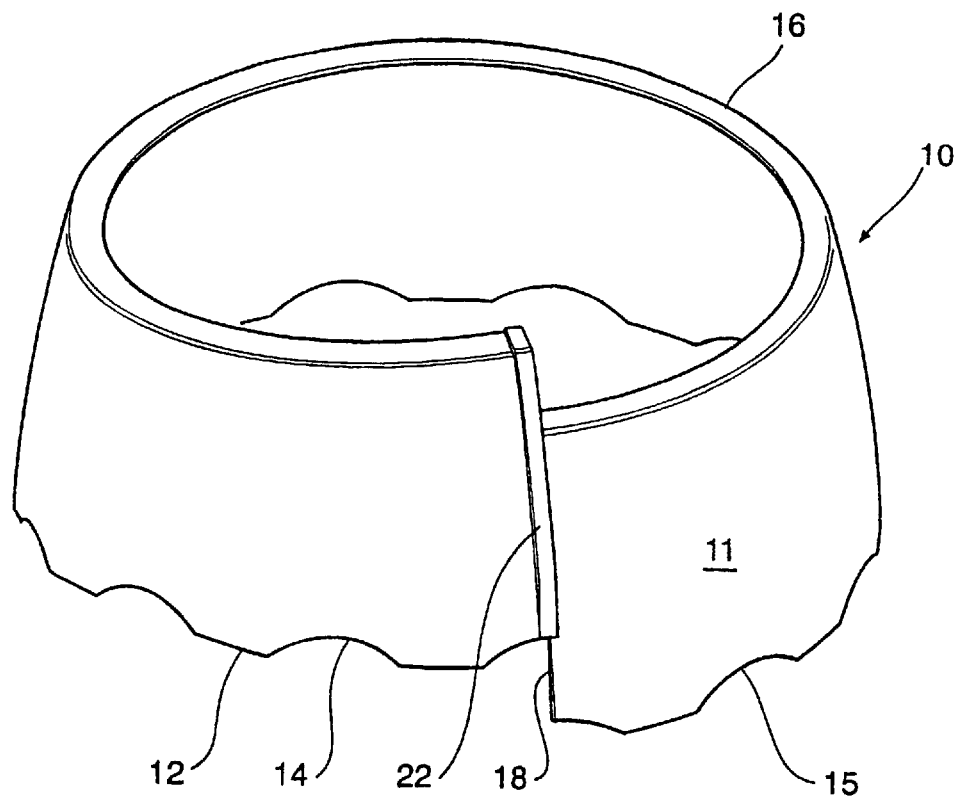
Figure 13:
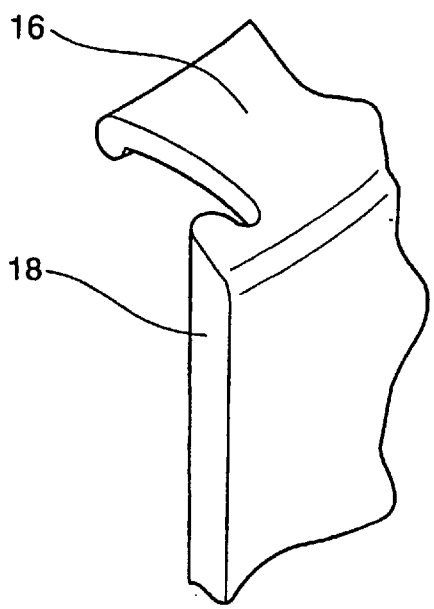

FIG. 4 is an enlarged view of the joining ends of the wall of the embodiment as shown in FIGS. 1, 2 and 3 showing the shape of the engaging ends which, when separated, define a discontinuity of the walls FIG. 5 is a view in elevation of a first of the ends, FIG. 6 is a view in elevation of a second of the ends, FIG. 7 is a perspective view with part cut away of the detail of the joining ends in the embodiment, FIG. 8 is a further view with cross sectional views of the ends in different alignment, FIG. 9 is a view of the ends partly through a joining together showing the sliding relative positions, FIG. 10 is a view from an alternate side of the ends as in FIG. 9, FIG. 11 is a view of the surround when in a water retaining position within the ground around a tree, FIG. 12 illustrates the way in which the wall of the surround in the embodiment is twisted to enable respective ends to be inserted one within the other and thereby to be joined or separated, and FIG. 13 is a perspective view of a detail at the top of one of the ends.

In the embodiment shown in FIGS. 1 to 13, tree surround 10 comprises a circular wall 11 formed by injection moulding in the circular shape shown from flexible polymeric material specifically polypropylene, By moulding this shape as a circular (or perhaps otherwise described as an approximately cylindrical shape) in the first instance means that the shape is in a resting mode when in this shape at the start. Accordingly, when the ends are joined there will be minimal pressure to urge on an ongoing basis any separation of any interlocked joint. There will therefore be a minimal pressure on the joint.

The side wall 11 has a curvature when seen in cross section, as shown in FIG. 2, and is larger which is to say has a larger diameter at its base lower edge 12 than at its upper edge 13. The extent of the taper thus formed is such as to ensure that respective surrounds even when in a with-ends-joined status will nest one within the other to enable efficient transport of many of the surrounds together in an assembled form.

The lower edge 12 is in the form of a series of scallops 14 which define between them "blunt spikes" 15 which can more readily enter the soil than a straight edge, and physically assist in the retention of the surround in a situation where it has been located.

The upper edge 13 is directed radially inwardly in the form of a flange 16 and this provides some stiffness and strength. Further this flange 16 provides a preferred aesthetic appearance and also provides a wide upper surface that will not be especially vulnerable to fracture in the event of impact from agricultural machines or the feet of workers in the vicinity. Such a feature is available by reason of the method of moulding.

One end 17 of the wall 11 defining the "split" or discontinuity terminates in a bulbous bead 18 which extends substantially fully along the length of the edge as shown in FIG. 4, and that is located when assembled with an interlocking and interference fit into a space of matching shape defined by a curved flange 19 along the other edge and extending fully along the length of this end 20.

This is accordingly an interlocking interengagement so that the ends are joined by reason of the interlocking of the respective shapes and are not dependent on resilient pressures between for instance the plastics materials to keep the joint together. There is therefore no or at least a minimal amount of ongoing pressure between components and as such there will be no pressure to cause ongoing creep of the plastics materials. Accordingly despite the potential for the most demanding of environmental conditions the result with this arrangement is that the assembly will have a high stability and can be expected to stay in a water retaining condition as well as remaining aesthetically visually pleasant over a substantial time as compared to the prior art described.

The material is selected to be sufficiently flexible so that the wall 11 can be distorted or twisted as is shown in FIG. 12 to allow the bead 18 to be inserted from one end and to be pushed or pulled with a sliding action. Because of the flexible nature of the material than allowing for the twisting of the wall 11, it is still feasible to slide the bead 18 into the space defined by the flange 18 and an offset flange 22. This is assisted by having a lead in shape as shown at 21 into the space. The offset flange 22 further defining the space allows for the alignment of the wall 11 to match at each of the ends.

As shown in FIG. 11 the surround 10 in use will be embedded in the ground usually to a depth that will approximate the depth of top soil around a tree 23. This ensures that water poured into the surround will not easily dissipate through the top soil. However the depth is dependent on local conditions and can be varied.

In practice the improvement is such that the need for watering can be significantly reduced because water is maintained so much more effectively.

When the tree 23 grows to need a larger surround then the surround shown can be very easily opened out by relative sliding of the ends and twisting of the wall and therefore removal can be effected very simply and easily.

The part-circular flange 16 surrounding the bead 18 has been used to reduce any effect of distortion which can take place upon cooling of the moulded product, and that distortion should be accommodated to assist with water retention The bead 18 and the space are dimensioned to have a very close fit to effect an adequate water retaining effect. With the plastics material only slightly flexible this can assist in providing a tolerance none the less than assists in allowing the two ends to be relatively readily slidable one with respect to the other while being sufficiently tight to resist substantial passage of water therethrough.

The arrangement described thus is fundamentally different from the disclosure. The disclosure relies upon resilient pressure to keep ends together and further, will be joined together other than by a relative sliding action between projections and recesses, Further, these would need to be joined by being pressed together face against face. With the feature that there are to be a plurality of projections joining recesses which are parallel then it is not feasible to even attempt to join ends by using any relative longitudinal sliding. This is made even more impractical be the fact that each projection is under retaining pressure when within a recess so that the would implicitly be a very high resistance to longitudinal relative movement.

A consideration of the above embodiment will indicate the shape of the surround, in having an increased diameter near the ground, will accommodate some tree ring growth. The removal or replacement is simple. The ground engagement is such to not only inhibit excessive water leakage but also to physically retain the surround in ground of various types without the need for digging a deep annular trench, for example, in hard clay. The water retention in both instances can be quite substantial enabling, for example, a watering vehicle to have to stay for only a small time at the location of a tree to discharge the required amount of water, and can then move on to the next tree.

In use the surround is assembled so as to have the otherwise discontinuous ends joined and then is partly buried in the ground as shown in FIG. 11. Water thereafter will be poured into the centre of the surround and will accordingly be kept from spreading laterally beyond the surround. This means that the water will kept for longer above a root zone of a plant and will be used more efficiently as a result.

With the embodiment it is found to be a very simple and physically easy task to twist the wall of the surround to get initially opposite parts of the respective ends together and then slide the two ends in a longitudinal relatively opposed direction together. The feature of only one bead on one end and a space at the other facilitates this action. Thereafter, the joined ends are not under and residual pressures and will accordingly last for a substantial period in extenuating environments.

What is claimed is:

1. A single piece plant surround comprised of a circular moulding of plastics material which is sufficiently flexible to allow a bottom portion of a first end to be aligned with a top portion of a second end, and has interfering surfaces between the first and second ends, the surfaces at the respective ends having interlocking shapes and being relatively slidable along their respective longitudinal alignment to effect an interlocking joining between the ends to provide a water retaining surround, further characterised in that the circular moulding defines a wall which has a larger diameter at its lower edge than at its upper edge to provide a nesting shape for nesting with identical surrounds.

2. A plant surround comprised of a single piece of circular moulding of flexible water impervious plastics material which is discontinuous by having separable ends, there being interfering surfaces between the ends defining the discontinuity, the surfaces at the respective ends having interlocking shapes and being positionable so that a top portion of one end aligns with a bottom portion of an other end, and the ends are then being relatively slidable along their respective longitudinal alignment to effect an interlocking joining between the ends to provide a water retaining surround, further characterised in that the circular moulding defines a wall which has a larger diameter at its lower edge than at its upper edge to provide a nesting shape for nesting with identical surrounds.

3. A plant surround as in either of claims 1 or 2 wherein said plant is a tree.

4. A plant surround as in either of claims 1 and 2 further characterized in that one edge defining a split terminates in a bulbous bead, which is inserted with an interference fit into a space defined by a curved flange along the other edge such as to allow for a sliding action to effect a separating of the two edges.

5. A plant surround as in either of claims 1 or 2 when said plant surround is embedded with part of a wall defined by the circular moulding within the ground and around a tree.

6. A single piece plant surround comprised of a circular moulding of plastics material which is sufficiently flexible to allow a bottom portion of a first end to be aligned with a top portion of a second end, and has interfering surfaces between the first and second ends, the surfaces at the respective ends having interlocking shapes and being relatively slidable along their respective longitudinal alignment to effect an interlocking joining between the ends to provide a water retaining surround, further characterised in that the circular moulding has an upper edge which is directed radially inwardly in the form of a flange.

7. A plant surround comprised of a single piece of circular moulding of flexible water impervious plastics material which is discontinuous by having separable ends, there being interfering surfaces between the ends defining the discontinuity, the surfaces at the respective ends having interlocking shapes and being positionable so that a top portion of one end aligns with a bottom portion of an other end, and the ends are then being relatively slidable along their respective longitudinal alignment to effect an interlocking joining between the ends to provide a water retaining surround, further characterised in that the circular moulding has an upper edge which is directed radially inwardly in the form of a flange.

8. A plant surround as in either of claims 1, 2, 6 or 7 further charaterised in that there is extending along a first of the ends a bulbous bead and along a second of the ends a space defined by a curved flange within which the bulbous bead will fit to effect the interlocking joining.

9. A plant surround as in either of claims 1, 2, 6 or 7 further characterized in that a lower edge of the moulding is scallop shaped.

\* \* \* \* \*